M. W. KIDDER.
Process of and Apparatus for Manufacturing Gas.
No. 236,039. Patented Dec. 28, 1880.

4 Sheets—Sheet 2.

M. W. KIDDER.
Process of and Apparatus for Manufacturing Gas.
No. 236,039. Patented Dec. 28, 1880.

4 Sheets—Sheet 3.

M. W. KIDDER.
Process of and Apparatus for Manufacturing Gas.
No. 236,039. Patented Dec. 28, 1880.

Witnesses.
Geo. R. Kelso.
Geo. W. Pierce.

Inventor,
M. W. Kidder
by Wright & Brown
Attys.

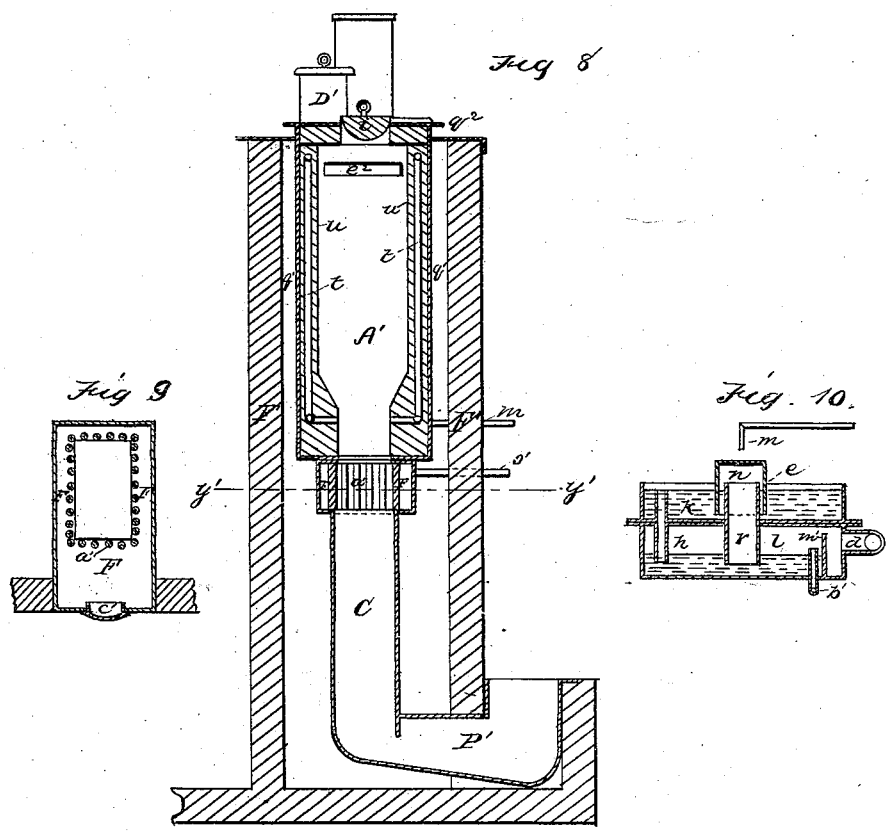

UNITED STATES PATENT OFFICE.

MOSES W. KIDDER, OF LINCOLN, MASSACHUSETTS.

PROCESS OF AND APPARATUS FOR MANUFACTURING GAS.

SPECIFICATION forming part of Letters Patent No. 236,039, dated December 28, 1880.

Application filed January 12, 1880.

*To all whom it may concern:*

Be it known that I, MOSES W. KIDDER, of Lincoln, in the county of Middlesex and State of Massachusetts, have invented certain Improvements in Process of and Apparatus for Manufacturing Gas, of which the following is a specification.

Figure 1:
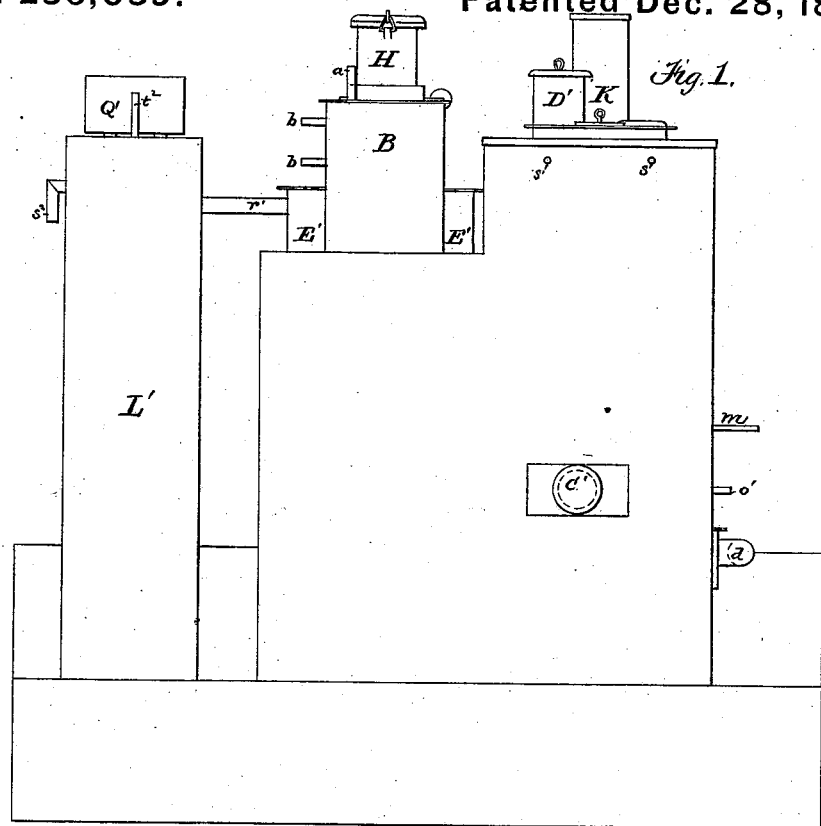
Figure 2:
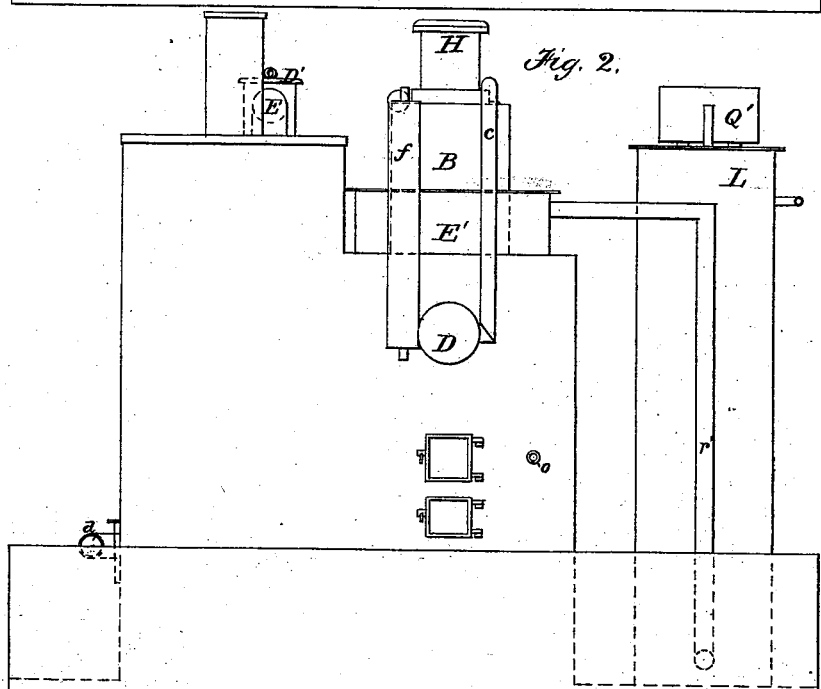
Figure 3:
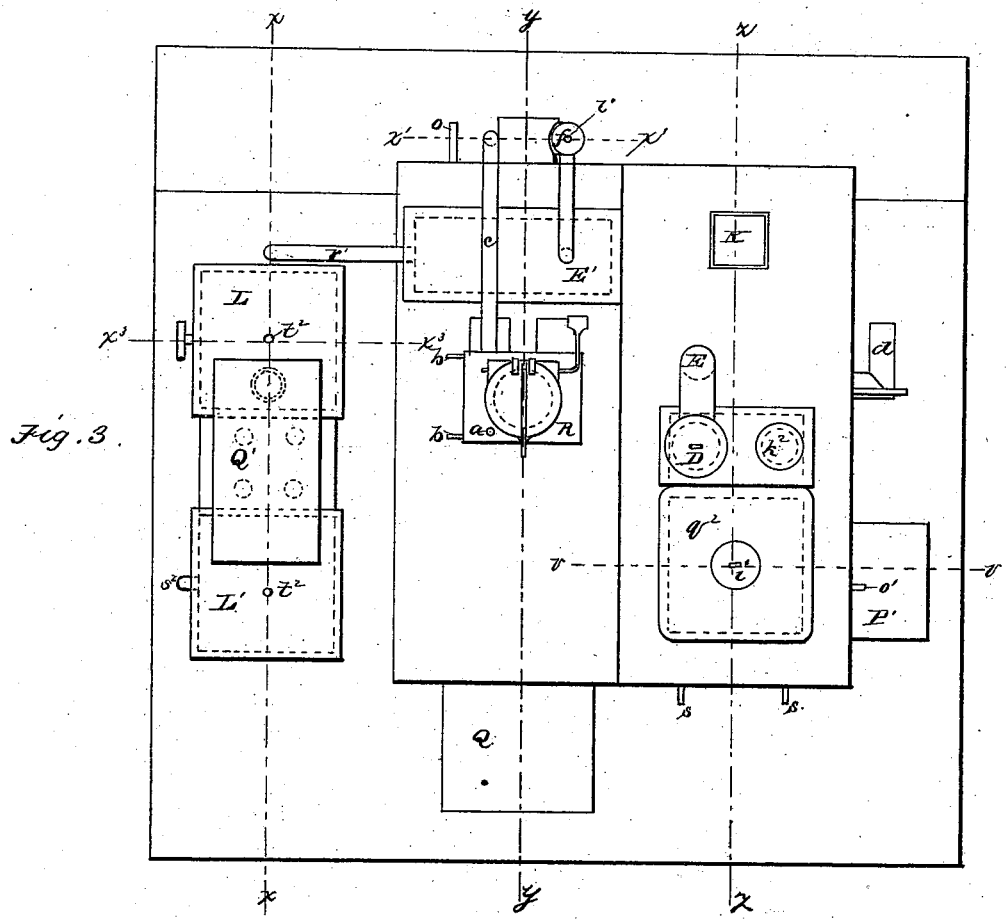
Figure 4:
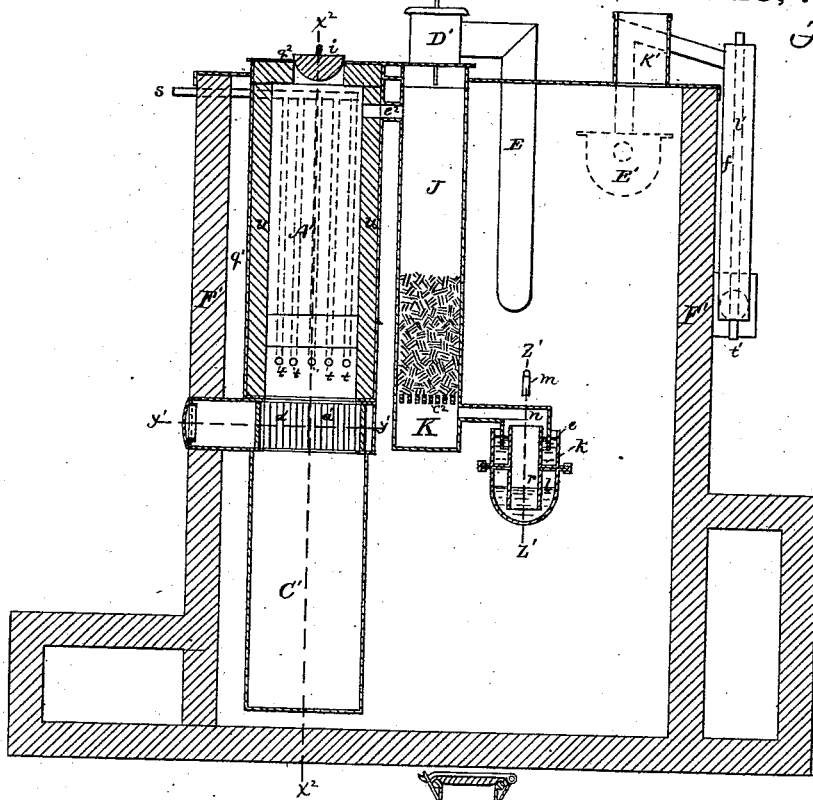
Figure 5:
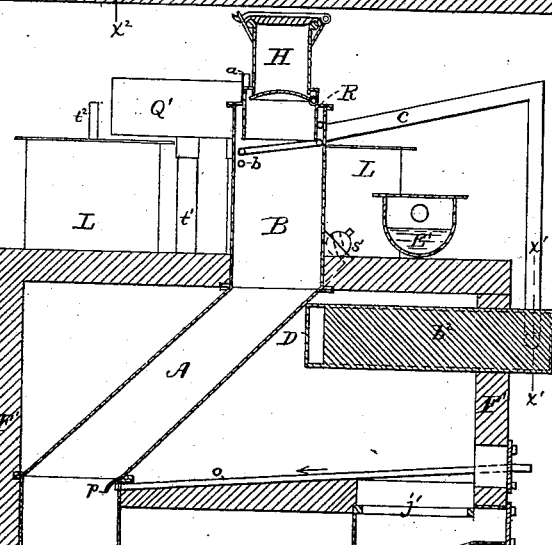
Figure 6:
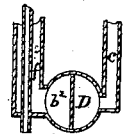
Figure 7:
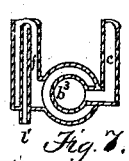

Of the accompanying drawings, forming a part of this specification, Figure 1 represents a front elevation of the apparatus embodying my invention. Fig. 2 represents a rear elevation. Fig. 3 represents a top view. Fig. 4 represents a vertical section on line $z\,z$ of Fig. 3. Fig. 5 represents a vertical section on line $y\,y$ of Fig. 3. Fig. 6 represents a vertical section on line $x'\,x'$ of Figs. 3 and 5. Fig. 7 represents a modification. Fig. 8 represents a vertical section through line $v\,v$ of Fig. 3. Fig. 9 represents a horizontal section through line $y'\,y'$ of Fig. 8. Fig. 10 represents a vertical section of water-sealing troughs through line $z'\,z'$, Fig. 4.

The same letters of reference indicate the same parts in all the figures.

The object of this invention is the production of illuminating-gas of greater brilliancy, illuminating power, and purity than ordinary coal-gas, with an economic reduction in cost by avoiding the decomposition of the volatile hydrocarbons employed in its manufacture, and also to reduce the expense for labor.

The invention consists, first, in the process of making illuminating-gas, consisting in passing heated water-gas mingled with volatile hydrocarbons through an unheated chamber or magazine containing coal at a low temperature, (whereby the volatilized pitchy matter of the hydrocarbons is arrested for subsequent distillation,) then passing the uncondensed gases and vapors to and through a superheating-retort, and lastly through scrubbers and purifiers in the usual manner.

The invention also consists in giving to the distilling-chamber of the apparatus such an inclination as to insure more effective action from the fire upon the contents of the chamber and better control of such contents by the operators.

The invention also consists in the arrangement of a magazine above the upper end of the distilling-chamber for the reception of coal. The magazine is not exposed to the fire, so that the coal therein becomes slowly warmed by the gases and vapors passing through the magazine from the distilling-chamber, and while being warmed acts as a condensing medium for the more condensable vapors from the coal or from oil, thus returning them to the distilling-chamber to be again acted on by the fire.

The invention also consists in a condenser in the magazine to effect the more thorough condensation of pitchy matter volatilized from the coal in the distilling-chamber.

The invention consists, also, in certain details of construction and combinations of parts, all of which I will now proceed to describe and claim.

In the construction of the apparatus hereinafter described, I first provide a substantial foundation of stone for the several parts, upon which brick walls $F'\,F'$ are built to inclose and support the various parts.

The water-gas generator $A'$, as shown in section in Figs. 4 and 8, is made outwardly of cast-iron, about ten feet high from the top of the grate $a'$ to the top plate, $q^2$, in which is the opening for the introduction of coal, which opening is closed by the hemispherical stopper $i$. The weight of this stopper is such that it constitutes a safety-valve for any sudden over-pressure in the chamber $A'$. This chamber $A'$ is about four feet square, and is lined with fire-bricks $u\,u$ of special form, having passages $t\,t$ through them for the conduct and superheating of steam. Extending downwardly from the bottom of this chamber about twenty inches is a grate, $a'$, made of vertical bars, which are simply continuations of the walls of the chamber. Below the grate is an ash-trunk, $C'$, reaching down a few inches into the water contained in the shoe $P'$, in which it is sealed. Around the grate $a'$ is a space, $F$, into which air is forced through the pipe $o'$. $c'$ represents a gas-tight door opening into the space F. Near the top of this combustion-chamber $A'$ is an opening, $e^2$, into the charcoal-chamber J, through which the gases may pass from the combustion-chamber. The charcoal-chamber J is of the same height and width as the combustion-chamber, but about half as large the other way. At the bottom is a grate, $c^2$, to support charcoal, and beneath the grate is an ash-pit, K, with an air-tight door. Gas passes from the ash-pit through water-sealed pipes $n$ and $r$ to troughs $k$ and $l$. These troughs are about four feet long, of cast-iron. The upper trough is open at the top, and is about two feet wide and fourteen inches deep. This trough has an overflow-pipe, $h$, which passes down and is sealed in the water of the lower trough. The large pipe $r$ passes from the upper to the lower trough, and is sealed by the water in the latter to prevent the reflux of gas. The lower trough is provided with an overflow-pipe, $b'$, an outlet-pipe, $d$, for gas to the holder, and a partition, $m'$, to prevent the flow of water into the gas-pipe $b$. The overflow-pipe $b'$ is of such length as to insure the seal of the pipe $r$.

At the top of the charcoal-chamber is provided a valve inclosed in a dome, $D'$, from which the gases are passed through pipe E into the fire-arch, to be consumed when the fire is being aroused by a blast of air through pipe $o'$. The charcoal-chamber is also provided with an opening, $K^2$, for the introduction of charcoal.

The shoe $P'$ is made of such form and dimensions as to best facilitate the removal of ashes from the trunk $C'$.

The chimney $K'$ is for the escape of gases produced from the fire in the arch under the retort D.

$s\ s$ are pipes for the introduction of steam to the passages $t\ t$ in the fire-brick lining $u$.

Around the water-gas generator is a space, $q'$, nine inches wide, for the passage of smoke from the fire upon the grate $j'$ to the chimney $K'$.

The coal-distilling division is built up from the shoe Q, which is about five feet wide, eight feet long, and three feet deep. In this the coke-trunk C is sealed at its lower end. This coke-trunk is made of plate-iron, riveted, and is about two and a half by five feet in cross-section, and about six feet high. At the top is a cast flange to connect it with the inclined distilling-chamber A, which is of cast-iron, one and a quarter inch thick, and flanged at each end. The internal dimensions of the chamber A are, at the lower end about two and a half by five feet, and at the top about two by four and a half feet, being uniformly enlarged from above downward. At the bottom, on the side nearest the fire, is an overhanging plate, $p$, extending the entire width of the chamber. Beneath this plate enters a pipe, $o$, for the introduction of water-gas from a holder. (Not shown in the drawings.) The top and bottom terminal lines are parallel, the top being six feet above the bottom.

To the flange at the top of the chamber A is fixed the magazine B, which is riveted plate-iron with cast flanges at the top and bottom. The top is also of cast-iron. The lower end of the magazine exactly fits and is firmly bolted to the upper end of the distilling-chamber.

The height of the magazine is about six feet to the top plate, R. From the side of this magazine, near the top, emerges a pipe, $c$, for the passage of the vapors and gases from the distilling-chamber to the retort D. On the same side of the magazine, near the bottom, are two spherical valves, as described in United States Patent No. 168,904, for the passage of a bar to force the coal down through the distilling-chamber. Within the magazine is placed a coil of pipe, $b$, for the circulation of water to cool and condense the more condensable vapors from the gases passing through the magazine. Above the magazine, and resting upon the top plate, R, is the hopper H, for the introduction of any solid material, as coal or wood, &c., from which gas may be made. This hopper is substantially the same as described in United States Patent No. 165,168.

The retort D is divided either by a straight vertical partition, $b^2$, extending from the retort-lid nearly to the opposite end, as shown in Figs. 5 and 6, or by a concentric pipe, $b^3$, as in Fig. 7. The retort is about nine feet long and twenty inches internal diameter, and the iron of which it is made is one and a quarter inch thick. The retort is closed at the opposite end from the lid and flanged at the other to attach the head, which admits gas through pipe $c$ from the magazine and discharges the same through the stand-pipe $f$ to the hydraulic main $E'$. The distilling-chamber A and retort D are so set in a brick arch as to be heated by the fire upon the grate $j'$, also by the gas through pipe E from the water-gas generator, and the pipe $o$ for water-gas passes over the floor of the arch, so that the gas is heated before entering the distilling-chamber.

Beneath the grate $j'$ is an ordinary ash-pit with its door. The space above the grate is also provided with a door, as usual.

The stand-pipe $f$ has within and passing vertically through it a water-pipe, $l'$.

When the water-gas generator and distilling-chamber are in place and the inclosing-walls are raised to a sufficient height the spaces about the apparatus are all closed in by brick-work at the top.

From the hydraulic main $E'$ the pipe $r'$ extends to suitable gas scrubbers and purifiers. (Not shown in the drawings.)

Operation: The shoes Q and $P'$ are filled with water, so as to seal the lower ends of the coke-trunk C and the ash-trunk $C'$. Next the coke-trunk is filled with coke and the ash-trunk with ashes. A fire is then kindled in the water-gas generator, the valve in the dome D being open, so that gases can pass to the fire-arch. Coal is added as required through the top plate until a sufficient quantity is burning. Then the air is shut out from the air-space around the grate, the valve in the dome D is shut, and steam is admitted through the pipes $s\ s$ to the coal in the combustion-chamber, where the incandescent carbon takes from the steam the oxygen, forming carbonic oxide and carbonic acid, and the hydrogen is set free. These gases mingle together and pass into and through the charcoal-chamber, where the charcoal is kept incandescent by the surrounding heat. This arrests the carbonic acid and decomposes it by taking one atom of oxygen from it and combining it with the carbon of the charcoal, the result being carbonic oxide. These gases now pass at a high temperature down through the grate $c^2$, the pipes $n$ and $r$, and out of the lower trough, $l$, by the pipe $d$ on its way to the water-gas holder, the gases being cooled by the water, which is constantly flowing through pipe $m$ upon the pipe $n$. Having a supply of water-gas, the distilling-chamber A and magazine B are filled with bituminous coal and the air thoroughly displaced from the apparatus by water-gas drawn through the pipe $o$ from the holder. Then the fire is kindled upon the grate $j'$ under the retort D and urged and maintained to effect the distillation of the coal, water-gas being passed in due quantity to mingle with the vapors from the coal to constitute illuminating-gas. If it is desired to use oil in any form, it is introduced upon the coal through the pipe $a$. As the vapors of the hydrocarbons pass up through the magazine B they come in contact with the coal at a low temperature, and with the condensing-pipe $b$, which has a constant circulation of water through it, and the heavier and more condensable matters are condensed and fall down into the distilling-chamber, to be further broken up by the action of heat. The inclination of the distilling-chamber causes the condensed matter or oil to come in contact with the heated lower wall of the distilling-chamber, whereby the redistillation of the oil is more perfectly effected than by the heated coal contained in the chamber. The uncondensed vapors and gases pass from the magazine, by the pipe $c$, to the retort D, passing in upon one side of the partition $b^2$, or through the pipe $b^3$, and out by the other side of the partition or pipe, through the stand-pipe $f$, to and through the hydraulic main E' and pipe $r'$ to scrubbers, exhausters, and purifiers, as in the ordinary process.

I am aware that pitchy matters have been separated from the hydrocarbons distilled from coal through the direct and combined action upon the pitchy matters of the gas obtained from the coal, and of free steam, the hydrocarbons being passed through a chamber containing twigs, as in Patent No. 214,042. In my process, however, no steam is employed, and the hydrocarbons are arrested upon the surface of coal, from the surface of which they may be distilled.

I am also aware that it is not new, broadly, to make a distilling-chamber with an inclination from a vertical line.

I am also aware that a vertical grate for the lateral support of cinders is not new.

I claim—

1. The process for making illuminating-gas, consisting in passing heated water-gas mingled with volatile hydrocarbons through an unheated chamber or magazine containing coal at a low temperature, whereby the volatilized pitchy matter of the hydrocarbons is arrested for subsequent distillation, then passing the uncondensed gases and vapors to and through a superheating-retort, and lastly through scrubbers and purifiers, as set forth, the coal presenting surfaces from which the volatile hydrocarbons may be redistilled.

2. In combination with the magazine B and coke-pit C, the intermediate inclined distilling-chamber A, having a sufficient inclination to permit the coal to gravitate and prevent its too rapid descent, and also to insure the contact with the lower heated wall of said chamber of oil descending from the magazine, whereby the redistillation of such oil is assured, as set forth.

3. The combination, with a heated distilling-chamber, A, of a magazine, B, located above the distilling-chamber and outside of the walls inclosing the fire-spaces, whereby the coal in said magazine is kept at a low temperature to condense volatilized pitchy matter arising from the distilling-chamber, and such condensed matter returned to the distilling-chamber for redistillation, as set forth.

4. The magazine B, provided with a condenser, $b$, to effect the more thorough condensation of pitchy matter, as set forth.

5. The retort A, with the overhanging plate $p$, in combination with the pipe O.

6. The combination of the superheating-retort, the magazine B, and the connecting-pipe $c$, the latter being located entirely outside of the fire-arch, whereby all connections and joints can be readily made and mended.

7. In a water-gas generator, the combination of the water-sealed ash-trunk $c'$, the vertical grate $a'$, and surrounding air-space F with the fire-chamber A', as set forth.

8. The combination of the gas-pipe $n$, the water-pipe $m$, the troughs $k\ l$, the gas-pipe $r$, the partition $m'$, and the outlet-pipe $d$.

In testimony whereof I have signed my name to this specification, in the presence of two subscribing witnesses, this 30th day of December, 1879.

MOSES W. KIDDER.

Witnesses:
C. F. BROWN,
GEO. W. PIERCE.